(12) United States Patent
Daum et al.

(10) Patent No.: US 7,691,360 B2
(45) Date of Patent: Apr. 6, 2010

(54) PROCESS AND PLANT FOR THE MANUFACTURE OF SULPHURIC ACID FROM GASES RICH IN SULPHUR DIOXIDE

(75) Inventors: Karl-Heinz Daum, Wiesbaden (DE); Ekkehart Seitz, Seeheim-Jugenheim (DE); Hermann Müller, Königstein (DE); Nikola Anastasijevic, Altenstadt (DE)

(73) Assignee: Outotec Oyj, Espoo (FI)

( * ) Notice: Subject to any disclaimer, the term of this patent is extended or adjusted under 35 U.S.C. 154(b) by 777 days.

(21) Appl. No.: 10/532,326

(22) PCT Filed: Oct. 21, 2003

(86) PCT No.: PCT/EP03/11659

§ 371 (c)(1),
(2), (4) Date: May 16, 2006

(87) PCT Pub. No.: WO2004/037719

PCT Pub. Date: May 6, 2004

(65) Prior Publication Data

US 2006/0245997 A1    Nov. 2, 2006

(30) Foreign Application Priority Data

Oct. 24, 2002    (DE) .............................. 102 49 782

(51) Int. Cl.
*C01B 17/69*    (2006.01)
*C01B 17/74*    (2006.01)

(52) U.S. Cl. ...................... 423/522; 423/528

(58) Field of Classification Search ................ 423/522, 423/528

See application file for complete search history.

(56) References Cited

U.S. PATENT DOCUMENTS 3,755,549 A    8/1973    Guth .......................... 423/533

(Continued)

FOREIGN PATENT DOCUMENTS

CN    1129193    8/1996

(Continued)

OTHER PUBLICATIONS

English Abstract of RU 2 174 945, published Oct. 20, 2001, I.M. Arpishkin, Database WPI, Section Ch, Week of Apr. 2002, Derwent Publications Ltd., London, GB.

(Continued)

*Primary Examiner*—Roy King
*Assistant Examiner*—Rebecca Lee
(74) *Attorney, Agent, or Firm*—Darby & Darby

(57) ABSTRACT

The present invention is concerned with a process and a plant for the production of sulphuric acid wherein a sulphur dioxide-containing feed gas is converted, at least in part, with oxygen in at least two contact stages of main contacts arranged in series, to generate sulphur trioxide, and wherein generated sulphur trioxide-containing gas is conducted to an absorber and converted therein to sulphuric acid. In order to be able to economically process feed gases of a sulphur dioxide content of between 13 and 66% by volume to sulphuric acid, using conventional catalysts, it is suggested to withdraw from a contact stage connected upstream of the last main contact stage, a partial stream of the sulphur dioxide- and sulphur trioxide-containing gas, to mix the said partial stream with the feed gas to generate a contact gas of a sulphur dioxide content of more than 13% by volume, and to return the same to the first contact stage.

17 Claims, 9 Drawing Sheets

U.S. PATENT DOCUMENTS

| | | | |
|---|---|---|---|
| 3,875,294 A | 4/1975 | Reh et al. | 423/534 |
| 4,061,743 A * | 12/1977 | Senjo et al. | 423/235 |
| 4,212,855 A * | 7/1980 | Kerner et al. | 423/522 |
| 5,194,239 A * | 3/1993 | Masseling et al. | 423/522 |
| 6,500,402 B1 * | 12/2002 | Winkler et al. | 423/522 |

FOREIGN PATENT DOCUMENTS

| | | |
|---|---|---|
| DE | 504635 | 10/1934 |
| DE | 1 054 431 | 4/1959 |
| DE | 2 026 818 | 12/1971 |
| GB | 1 397 044 | 6/1975 |
| WO | 9936175 | 7/1999 |

OTHER PUBLICATIONS

Taiwanese Official Action dated Oct. 13, 2004, corresponding to Taiwan Patent Application No. 092128992.

Ullmann's Encyclopedia of Industrial Chemistry, 5th edition, 1994, vol. A25, pp. 655-657.

* cited by examiner

PROCESS AND PLANT FOR THE MANUFACTURE OF SULPHURIC ACID FROM GASES RICH IN SULPHUR DIOXIDE

This application is a national stage entry under 35 U.S.C. § 371 of International Application No. PCT/EP2003/011659, filed Oct. 21, 2003, which itself claims priority to German Application No. DE 102 49 782.6, filed Oct. 24, 2002.

TECHNICAL FIELD

The present invention is concerned with a process for the production of sulphuric acid, wherein a sulphur dioxide-containing feed gas is converted, at least partially, with oxygen in at least two contact stages arranged in stages of main contacts, to generate sulphur trioxide, and wherein the generated sulphur trioxide-containing gas is fed to an absorber and reacted therein to form sulphuric acid, as well as a corresponding plant.

Conventionally, production of sulphuric acid is following the so-called double absorption process as described in Ullmann's Encyclopedia of Industrial Chemistry, 5$^{th}$ edition, vol. A25, pp. 635 through 700. For the catalysis of the oxidation of sulphur dioxide to sulphur trioxide, normally, vanadium pentoxide is employed as the active-component of the catalysts with a working range of between 380 and 640° C. Whereas at temperatures of exceeding 640° C. irreversible damage is done to the catalyst, the latter is inactive at temperatures below 380° C. To avoid damaging of the catalyst, feed gases are usually applied to the catalyst with a maximum sulphur dioxide content of 13% by volume, as the use of higher-concentration gases, due to the exothermic oxidation reaction, will develop excessive temperatures in the catalyst bed. Consequently, feed gases of a higher concentration have to be diluted prior to application to the catalyst, with air and/or technical oxygen and corresponding large gas volumes have to be fed to the catalyst. In particular when using pyrometallurgical off gases as sulphur dioxide-containing feed gases generated, e.g. in roasting and smelting of sulfidic copper or nickel concentrates and typically having a sulphur dioxide content of between 20 and 60% by volume, a high dilution factor is required, resulting in out-of-proportion investment and operating costs of the sulphuric acid plant.

It has been previously suggested to use partially oxidized process gas from a contact stage in lieu of air as a diluting gas. DE-AS 1 054 431 describes a process for the catalytic $SO_2$ oxidation wherein a part of the hot catalytically reacted process gas from the first contact stage is re-circulated and added to the original feed gases prior to admission to the first catalyst layer while the residual process gas, after cooling, by mixing with additional cold air is further oxidised in a subsequent contact stage. Due to re-circulation, the original feed gas, at the same time, is heated to the ignition temperature of the catalyst. As also in this process the gases will have to be diluted to such a degree that the gas applied to the first catalyst layer contains less than 13% by volume of $SO_2$, large amounts of diluting gas are required. A similar process has been described by DE-PS 504 635.

To overcome the afore-described disadvantages a variety of processes for the production of sulphuric acid have already been suggested wherein feed gases of a content of sulphur dioxide in excess of 13 percent by volume can be supplied to the catalyst.

Some of these processes provide on an alternative catalyst which can also be operated at temperatures higher than 640° C. (see e.g. WO 99/36175 A1).

DE-OS 20 26 818 discloses a process for catalytic oxidation of sulphur dioxide to sulphur trioxide in several contact stages with an intermediate absorption of the generated sulphur trioxide, wherein the feed gases are diluted prior to admission to the first contact stage by diluting air and by sulphur trioxide, the latter stripped from oleum, to a sulphur dioxide concentration between 10 and 20% by volume. The disadvantage of this process consists of excessive mechanical and process-technological implications which are required to continuously strip out sulphur trioxide from oleum, and a comparatively low yield of sulphur dioxide obtained in the first contact stage, as only sulphur trioxide rather than the reactants sulphur dioxide and oxygen are re-circulated.

SUMMARY OF THE INVENTION

It is, therefore, the object of the present invention to provide low-cost production of sulphuric acid on the basis of concentrated feed gases having a sulphur dioxide content of up to 66% by volume.

In the practice of the invention, this problem is solved by a process of the aforementioned type wherein a partial stream of the pre-catalysed sulphur dioxide- and sulphur trioxide-containing gas is withdrawn from a contact stage upstream of the last main contact stage, with the said partial stream being mixed with the feed gas to form a contact gas having a sulphur dioxide content of more than 13% by volume prior to being admitted to the first contact stage.

In the process design of the invention smaller volumes of diluting gas have to be admitted to the concentrated feed gases as compared to conventional processes in which gases containing less than 13% by volume of sulphur dioxide are applied to the first contact stage, with the consequence that with identical volumetric streams conducted through the contact stages a correspondingly larger amount of sulphuric acid is generated. Dependant on the sulphur dioxide content of the starting gases, with an identical plant size, a capacity increase of more than 50% is thus achievable. Overheating of the catalyst in the first contact stage will be reliably avoided despite the application of a contact gas containing more than 13% by volume of sulphur dioxide, because the sulphur trioxide introduced via the re-circulated partial stream shifts the thermodynamic equilibrium of the oxidation reaction

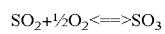

$$SO_2 + \tfrac{1}{2}O_2 \Longleftrightarrow SO_3$$

towards the educts, enabling a lower conversion and resulting in a lower gas temperature at the exit of the contact stage.

Another advantage of the process of the invention, in particular, also over the state-of-the-art processes with re-circulation of sulphur trioxide, resides in an enhanced recovery of energy. Due to the re-circulation, the heat energy of the re-circulated and partly reacted and hot process gas will be used for pre-heating the feed gas so that only a correspondingly low amount of heat energy is required to be externally supplied. Consequently, smaller heat exchangers will be adequate for the process of the invention.

Preferably, a contact gas having a sulphur dioxide content between 14 and 25% by volume will be supplied to the first contact stage. At a given volumetric gas flow passing through the individual contact stages, this results in a higher sulphuric acid yield. On the other hand, in this process design for avoiding overheating of the catalyst, no such large amounts of sulphur trioxide are yet required to be contained in the contact gas to adequately reduce the rate of conversion of sulphur dioxide to sulphur trioxide in the first contact stage.

In particular, processing of high-percentage feed gases originating, for example, from a pyrometallurgical plant having a sulphur dioxide content of between 25 and 66% by volume, it is feasible to add to the feed gas, prior to the supply to the first contact stage, air and/or technical oxygen in addition to the re-circulated part-stream, thereby enabling the preferred sulphur dioxide content of the contact gas of between 14 and 25% by volume with a comparatively low part-stream of partially oxidized process gas from a subsequent contact stage to be adjusted. To that extent, the air and/or technical oxygen can be supplied to the feed gas prior to, simultaneously with or after mixing with the re-circulated part-stream. Preferably, the air-to-technical oxygen ratio is selected such that the volumetric ratio of $O_2$ to $SO_2$ in the contact gas is less than 1.2, preferably less than 0.8 but not less than 0.5.

It is feasible that the volumetric stream of the part-stream of partially oxidized process gas supplied to the feed gas, based on the volumetric stream of the contact gas, is between 10 and 50%, preferably 15 through 35%.

With the conception of the invention it is further suggested to supply the contact gas to a pre-contact arranged upstream of the main contacts, to withdraw a process gas containing not more than 13% by volume of sulphur dioxide from this pre-contact and to introduce the same into the first contact stage of the first main (primary) contact. In this process design the main contacts can be operated similar to conventional processes. This is particularly advantageous if the process of the invention is applied in conventional plants already existing. The required re-vamping of the conventional plant in that case is limited to the integration of a pre-contact stage and to the re-circulation.

This pre-contact can be made up of one or more contact stages. To minimise the mechanical implications, the feed gas is conducted preferably only through a pre-contact comprising one or two stages. More preferably, the partial stream is discharged prior to absorption and cooled prior to return thereof to the first contact stage to a temperature of <500° C.

Basically, the part-stream of partially oxidized process gas (re-circulation gas) mixed to the feed gas can be extracted from the first through penultimate contact stages. In order to keep the volumetric flow of the re-circulating gas as low as possible, the said gas, preferably, is withdrawn prior to absorption from the last contact stage of one of the contacts, i.e. from the last contact stage of the pre-contact or of the first main (primary) contact, as the process gas at these points has the highest content of sulphur trioxide.

According to a special embodiment of the present invention, the process gas discharged from the pre-contact, prior to introduction into the first main (primary) contact, is conducted through a pre-absorber wherein sulphur trioxide, in a conventional manner, is removed from the process gas, at least in part, preferably in whole, and is converted to sulphuric acid. Moreover, it is suggested by way of alternative or in addition, to conduct the process gas discharged from the first main contact (primary contact), prior to introduction into the second main contact (secondary contact) through an intermediate absorber to remove the sulphur trioxide generated in the first main contact (primary contact) from the process gas and to convert the same to sulphuric acid. In analogy thereto, the process gas discharged from the second main contact (secondary contact), in the practice of the invention, is conducted through a final absorber before the process gas substantially free of sulphur trioxide and sulphur dioxide is removed from the plant. The sulphuric acid generated in the individual absorbers can then be withdrawn from the plant either separately or blended.

A special advantage involved with the process of the invention consists in the possibility to produce sulphuric acid of a conventional quality, as well as of a high-quality and, hence higher-priced sulphuric acid. By providing a preliminary, intermediate and final absorption, the impurities contained in the feed gases and especially contained, in substantial amounts, in pyrometallurgically produced feed gases, are almost completely removed from the process gas in the pre-absorption stage, so that the sulphuric acid generated in the intermediate and final absorption stages, corresponding to approximately 30% of the sulphuric acid produced in total by the process, is of a higher quality compared to the acid produced in conventional processes.

According to a further development of the inventive conception, it is suggested to pass only part of the process gas discharged from the pre-contact, prior to introduction into the first main contact (primary contact) through a pre-absorber, while the remainder of the $SO_3$-containing process gas, via a bypass line, is directly led into the main contact, thereby raising the share of higher-quality sulphuric acid to 60%.

According to another embodiment of the invention the gas discharged from the final absorber is subjected to gas scrubbing, particularly with hydrogen peroxide, ammonia or sodium hydroxide forming the neutralizing agent for the sulphur dioxide. In this embodiment it is even possible to completely forego the pre-contact as the disadvantage initially involved with the higher $SO_2$ emission can be compensated by gas scrubbing in accordance with the respective requirements.

According to a preferred embodiment of the invention, the re-circulation gas is used for adjusting the temperature of the gas leaving the first contact stage. The higher the partially reacted gas contained in the partial stream as returned to the primary contact stage, the more sulphur trioxide enters the contact stage and a correspondingly lower amount of sulphur dioxide is oxidized, resulting in lower gas exit temperature.

Moreover, the present invention is concerned with a plant to produce sulphuric acid from gases rich in sulphur dioxide, which is especially suitable to meet the requirements of the invention.

In accordance with the invention, the plant consists of at least two main contact stages (primary and secondary contacts) arranged in series and at least one absorber, with a pre-contact being connected upstream of the main contact (primary contact), and with the inlet of the pre-contact being in communication with the exit area of a contact stage connected upstream of the last contact stage of the second main contact (secondary contact).

According to a preferred embodiment, a re-circulation line for returning the part-stream of the process gas exiting the pre-contact, comprises a hot gas blower.

Preferably, the re-circulation line is leading from the exit area of the last contact stage of the first main contact (primary contact) or from the exit area of the last contact stage of the pre-contact to the inlet of the pre-contact.

According to a further development of the invention it is suggested that the pre-contact comprises one or two contact stages, the first main contact (primary contact) one to three and the second main contact (secondary contact) one or two contact stages. Of course it is also possible to provide more than two main contacts and/or more than two or three contact stages for the individual contacts. Basically, the individual contact stages can contain any desired catalyst material available within the state of the art for this purpose. However, preferably, conventional catalysts, for example those based on vanadium pentoxide—caesium-promoted or non-promoted—or based on any other metal oxides such as iron oxide, are provided.

Moreover it is suggested according to the invention, to provide a pre-absorber between the pre-contact and the first main contact (primary contact), an intermediate absorber between the first and the second main contact (secondary contact) and a final absorber behind the second main contact (secondary contact).

According to another preferred embodiment of the present invention, a bypass line leading past the pre-absorber is provided between the pre-contact and the first main contact (primary contact), via which the process gas, emerging from the pre-contact, in whole or in part, can be conducted past the pre-absorber directly into the first stage of the first main contact (primary contact).

Moreover, a bypass line leading past the pre-contact may be provided through which the contact gas, in whole or in part, may be conducted past the pre-contact directly into the first stage of the first main contact (primary contact).

The invention will now be described in detail by way of illustrative examples and in reference to the drawings, with all features described and/or illustrated forming the subject matter of the invention irrespective of the combination thereof in the claims or the dependence of the latter.

DETAILED DESCRIPTION OF PREFERRED EMBODIMENTS

Figure 1:
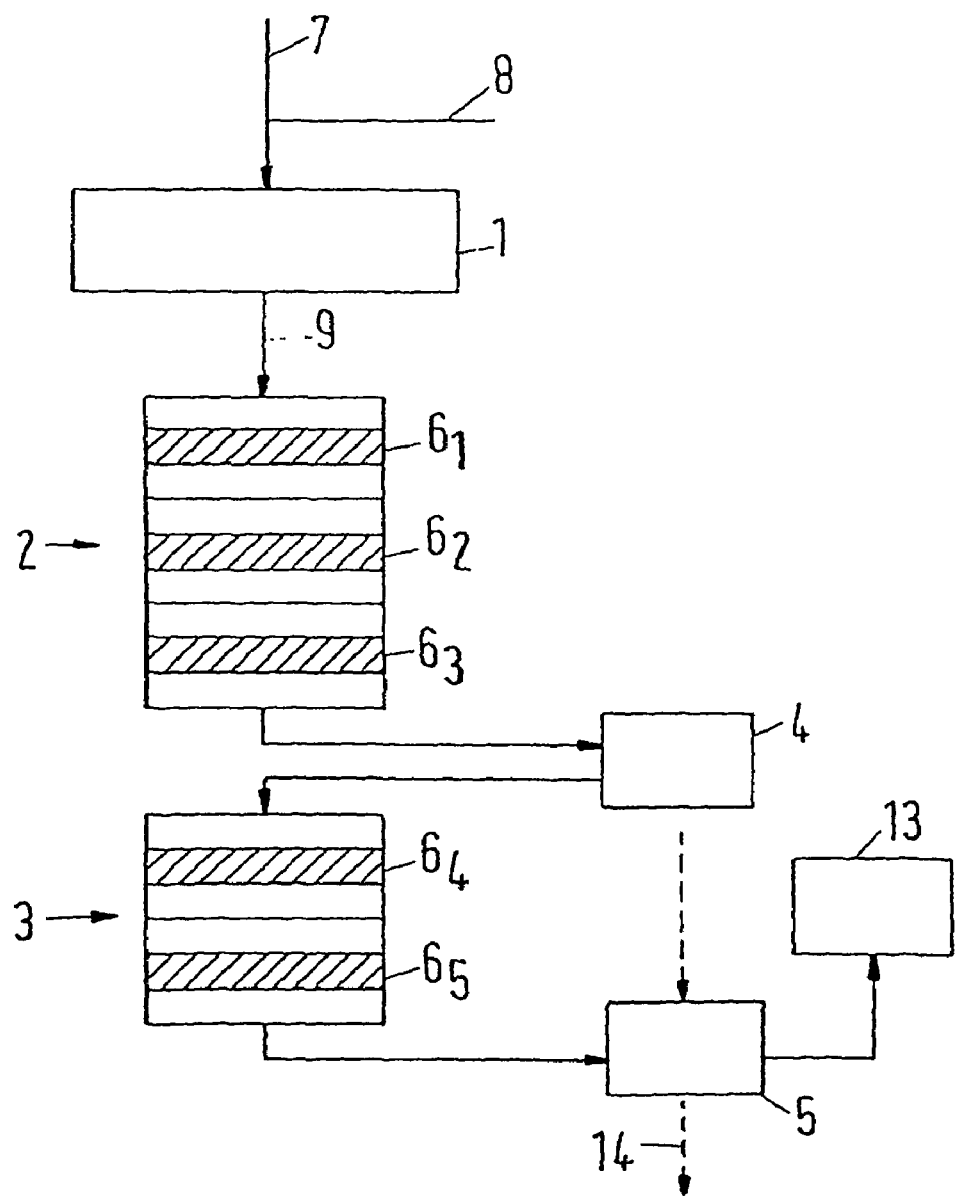
FIG. 1 shows a process diagram of a process and a plant according to the state of art.

The state-of-the-art plant for the production of sulphuric acid as shown in FIG. 1 and described, for example, in *Ullmann's Encyclopedia of Industrial Chemistry* consists of a gas drying tower 1, two main contacts 2, 3, one intermediate absorber 4 and a final absorber 5. While the first main contact 2 (primary contact) consists of three contact stages (layers) $6_1$ through $6_3$, all containing a catalyst based on vanadium pentoxide, two contact stages $6_4, 6_5$ are arranged in the second main contact 3 (secondary contact). Between each of the individual contact stages $6_1$ through $6_5$ an intermediate cooler (not shown) is located, wherein process gas leaving the preceding contact stages $6_1$ through $6_4$ is cooled to a temperature suitable for entering the respectively next contact stages $6_2$ through $6_5$.

Feed gas with a sulphur dioxide content of more than 13% by volume and having been produced, for example, in a pyrometallurgical plant, is supplied through line 7 and diluted by diluting air introduced via line 8 to a sulphur dioxide concentration of less than 13% by volume and fed to the gas drying tower 1. Subsequently, the dried gas mixture is withdrawn from the gas drying tower 1 via line 9 and preheated in a heat exchanger (not shown) to the inlet temperature of the first contact stage $6_1$ prior to admitting the gas mixture for oxidation to the three contact stages $6_1$ through $6_3$ of the first main contact 2 (primary contact). Gas exiting from the first main contact (primary contact) 2 is supplied to the intermediate absorber 4 via line 10, where it is contacted with aqueous sulphuric acid, and where the majority of the sulphur trioxide formed in the first main contact (primary contact) is absorbed while generating sulphuric acid. Via line 11, the residual gas is fed to the second main contact 3 (secondary contact) and successively admitted to the two contact stages $6_4$ and $6_5$. Gas from the second contact 3, is supplied via line 12 to the final absorber 5, in which the generated sulphur trioxide is converted into sulphuric acid. While the tail gas is discharged from the plant via line 13, the sulphuric acid generated in the intermediate absorber 4 and the final absorber 5 respectively, are combined and discharged from the plant via line 14 as a single stream.

Figure 2:
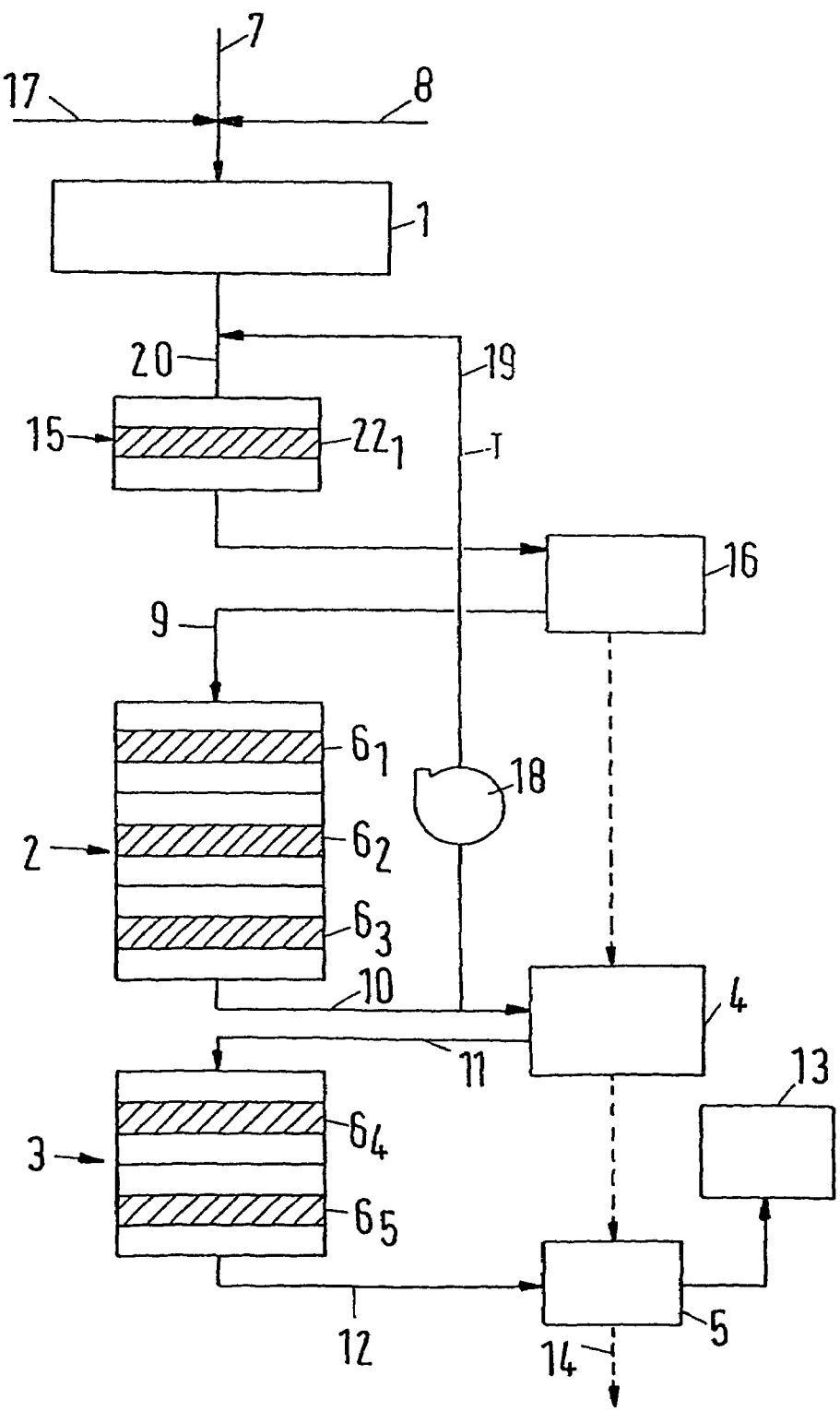
FIG. 2 shows a process diagram of a process and a plant according to a first embodiment of the present invention.

As presented in FIG. 2, the plant according to a first embodiment of the invention comprises the components of the above described conventional plant, which for the sake of ease, are provided with the same reference characters.

Moreover, the plant is comprised of a one-stage pre-contact 15, arranged upstream of the main contacts 2,3, a pre-absorber 16, a feed-in line 17 for the technical oxygen and a re-circulation line 19 for partially oxidized gas, whereas the latter is furnished with a hot gas blower 18. The re-circulation line 19 branches off from line 10 leading from the first main contact 2 (primary contact) to the intermediate absorber 4, and terminates in line 20 leading to the pre-contact 15. Preferably, the pre-contact 15 comprises the same catalyst as the individual contact stages 6 of the main contacts 2,3.

Feed gas with a sulphur dioxide content of more than 13% by volume, e.g. originating from a pyrometallurgical plant, is supplied via conduit 7, and mixed with air via line 8 and with technical oxygen via line 17. Thereupon the gas mixture is passed through the gas drying tower 1 to be then preheated in a heat exchanger (not shown). Subsequently, the partially oxidized gas (partial stream T) originating from the main contact 2 (primary contact), is supplied via line 19 with the said pre-heated gas mixture and the resulting mixture then enters the pre-contact 15 via line 20.

The individual flow rates of the gases supplied, and the conditions at the heat exchanger will be adjusted in such way, that the gas entering the pre-contact 15 has an inlet temperature optimal for the oxidation reaction which, when using a vanadium pentoxide catalyst, is at approximately 425° C., and, on the other hand, has a sulphur dioxide and sulphur trioxide content suitable to prevent a temperature rise to a level above the threshold of 640° C. detrimental to the catalyst. Simultaneously, the reaction is controlled by the sulphur dioxide and sulphur trioxide content, so that the sulphur dioxide content of the process gas after the pre-contact stage is adequate for an energetically optimum operation of the conventional main contacts 2, 3, but does not exceed 13% by volume. The gas exit temperature is primarily adjusted via the re-circulated gas flow. The gas temperature at the exit of the pre-contact is measured (actual value), compared to the nominal value and adjusted in accordance with the gas flow of the re-circulated partial stream (variable quantity), by actuating a valve or the like. By raising the re-circulating gas flow, the sulphur dioxide content of the gas entering the pre-contact 15 is reduced, while at the same time the sulphur trioxide concentration is increased, thus resulting in a lower sulphur dioxide conversion in the contact stage and, hence, in a lower gas exit temperature. To meet the afore-mentioned conditions, the corresponding gas flows will be adjusted so that the sulphur dioxide content of the diluted gas supplied to the gas drying tower 1, is preferably between 13 and 40% by volume, more preferably between 20 and 30% by volume, and that the gas mixture fed to the pre-contact 15 has a sulphur dioxide content between 15 and 21% by volume and a sulphur trioxide content between 1 and 5% by volume.

Via line 21, the gas discharged from pre-contact 15 is then fed to the pre-absorber 16, in which the sulphur trioxide formed in the pre-contact 15 is absorbed in concentrated sulphuric acid. The gas exiting from the pre-absorber 16, preferably has a sulphur dioxide content between 8 and 12% by volume and is fed via line 9 to the main contacts 2,3, in which the gas is further processed similar to as described with reference to FIG. 1, except for the re-circulation of the partial stream T. The amounts of sulphuric acid generated in the three absorbers 4, 5, 16 are combined and discharged from the plant via the product line 14.

Compared to a conventional plant as shown in FIG. 1 and with an equal gas flow through the first main contact 2 (primary contact), this plant enables the processing of an increased pyrometallurgical gas flow by 50% (corresponding to an increase in metal production by 50%) and, accordingly, producing an amount of sulphuric acid also increased by 50% per unit of time. As the additional equipment is restricted to the pre-contact 15, the pre-absorber 16 and the re-circulation line 19 including the corresponding control, the capital costs for re-furbishing a conventional plant in accordance with the invention are substantially lower than the costs involved with a new conventional plant that would be required to match the 50% capacity increase. In analogy, the capital cost required for a new plant according to the invention, would also be significantly lower than those involved with new plant designed for an equivalent capacity of conventional design.

Apart from the lower costs involved with the plant, another advantage of the plant of the invention results in substantially lower operating costs compared to a conventional plant, which is due to both, lower specific electric energy requirements and, above all, to a higher degree of specific recoverable thermal energy.

Another advantage involved with the process of the invention resides in the fact that, based on the processing of feed gases with a high $SO_2$ concentration and a therefrom resulting high $SO_3$ concentration after the oxidation, a direct production of oleum with a high content of free $SO_3$ of e.g. more than 35% is possible. At conventional plants with concentrations of $SO_2$ feed gas below 13% by volume, such oleum can only be manufactured by additional installations, such as distillation and condensation systems.

Moreover, the process of the invention permits an efficient and low-cost low-temperature heat recovery. The absorption of $SO_3$ and the formation of concentrated sulphuric acid is exothermic and generally requires the discharge of large amounts of heat (about 2 mio. kJ per tonne produced $H_2SO_4$), e.g. by cooling water. By employing so-called heat recovery systems, a substantial portion of the said heat can be converted into low-pressure steam. This portion increases with the increase of the $SO_2$ concentration in the feed gas, so that the process of the invention offers significant advantages.

Figure 3:
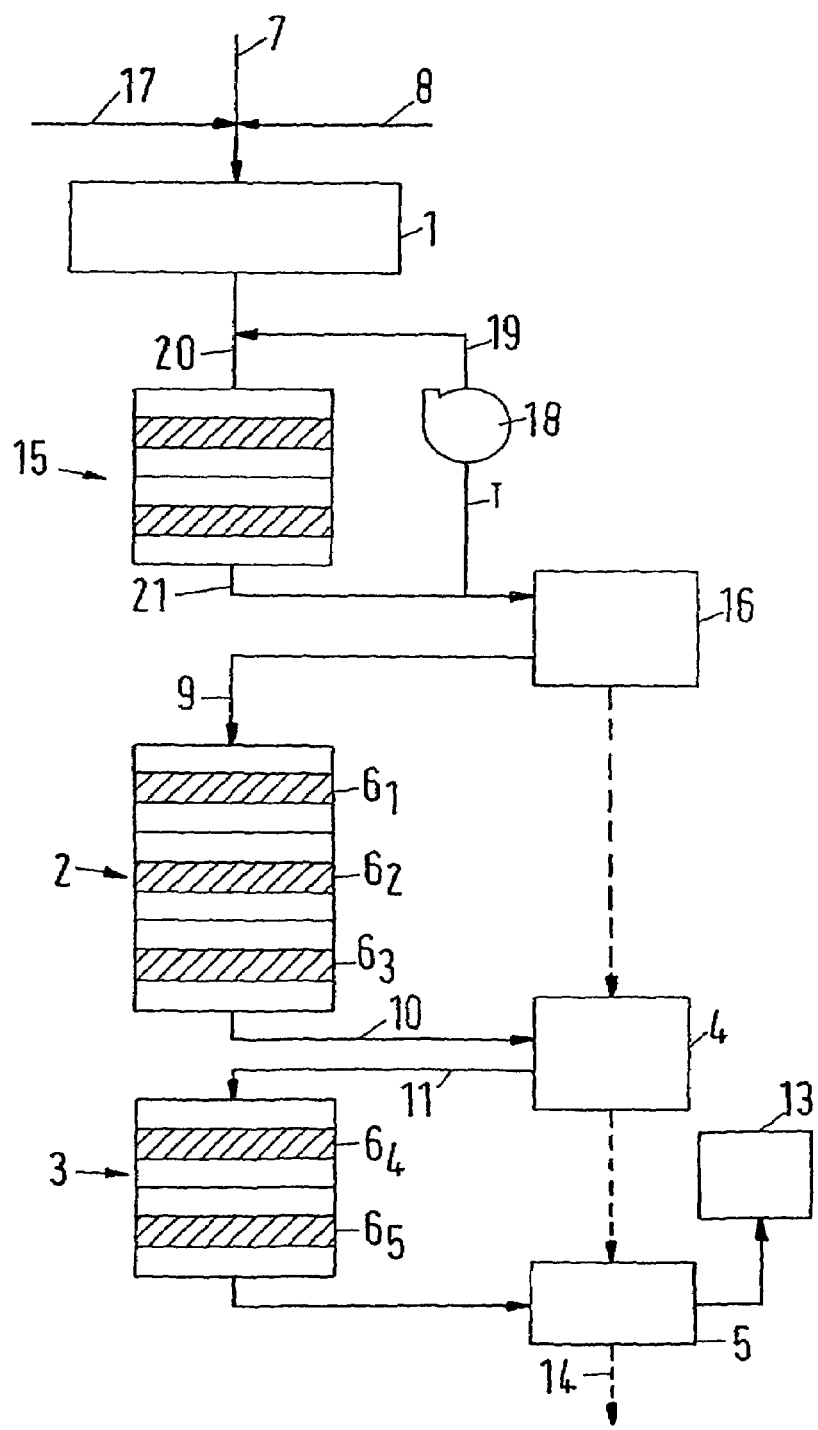
FIG. 3 shows a process diagram of a process and a plant according to a second embodiment of the present invention.

As opposed to the system shown in FIG. 2, the plant according to FIG. 3 comprises a pre-contact 15 with two contact stages $22_1$, $22_2$. Also in this embodiment the re-circulation line 19, branches off from line 21 originating from the second pre-contact stage 22$_2$ and leading to the pre-absorber 16, and terminating in line 20 leading to the pre-contact 15. Again, the pre-contact stages $22_1$, $22_2$ preferably have the same catalyst as the individual stages $6_1$ through $6_5$ of the main contacts 2,3.

This plant, compared to the one shown in FIG. 1, also enables a capacity increase of about 50%. Another advantage of this system is the complete de-coupling of the pre-contact arrangement consisting of pre-contact 15, re-circulation line 19 and pre-absorber 16 from the arrangement presenting a conventional plant downstream thereof. This leads to further reduction of capital cost for both, a new plant as well as for the re-furbishing of an existing plant. Also according to this embodiment, the total gas flow passing through the two main contacts 2, 3 is reduced, so that the savings thus achieved at the main contacts 2, 3 will compensate for the extra costs for the pre-contact.

Figure 4:
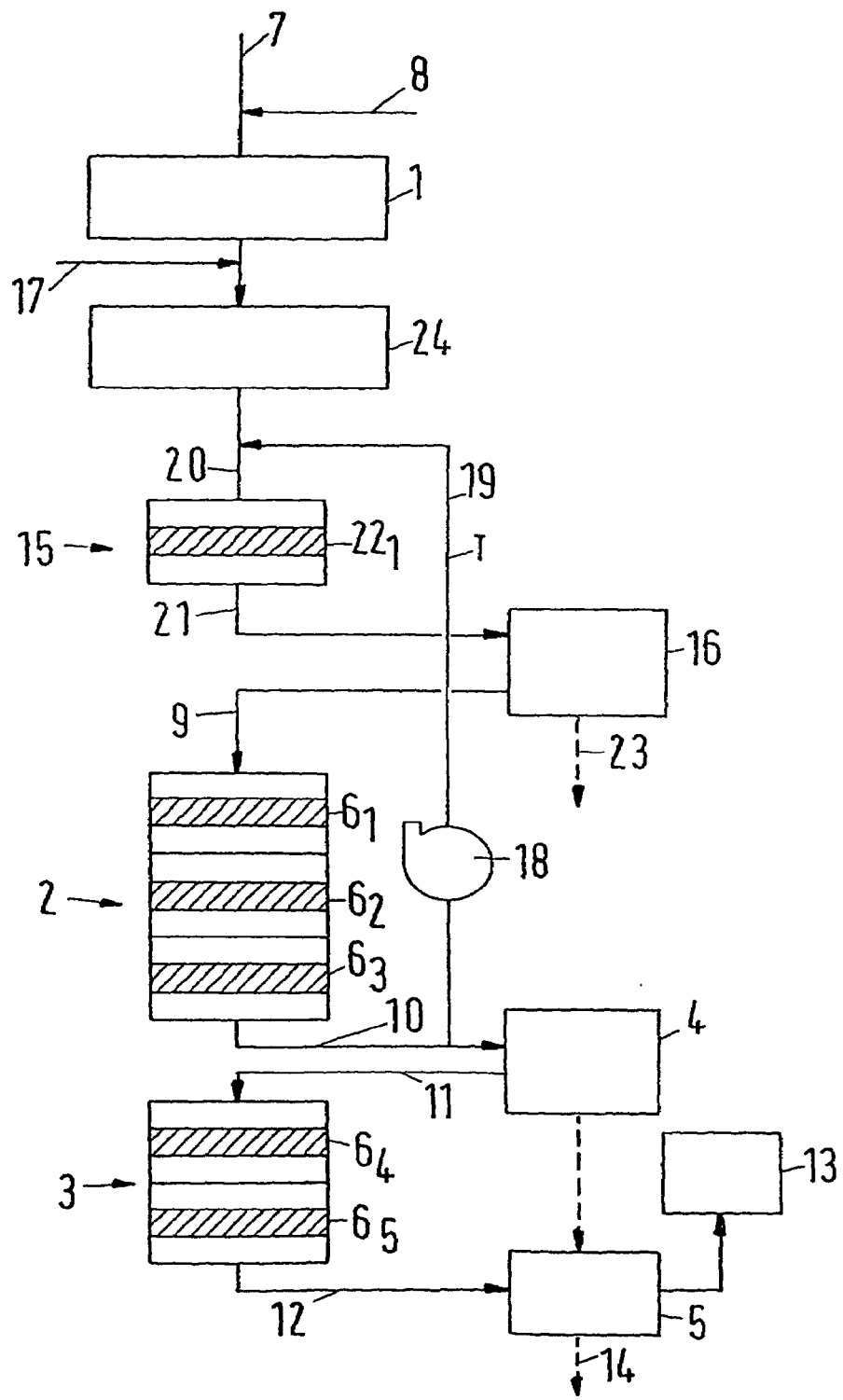
FIG. 4 shows a process diagram of a process and a plant according to a third embodiment of the present invention.

The system shown in FIG. 4 varies from the embodiment of FIG. 2 in that the sulphuric acid formed in the pre-absorber 16 is not combined with the acid generated in the downstream intermediate 4 and final absorbers 5, but is discharged separately from the plant via line 23. The impurities contained in the feed gases are almost completely removed by passing into the sulphuric acid at the first pre-absorption stage 16. Thus, the sulphuric acid generated in the intermediate absorber 4 and in the final absorber 5, corresponding to about 30% of the total amount of sulphuric acid generated in the plant, is of superior quality compared to the sulphuric acid generated in the absorbers of a conventional system, without requiring any cost-relevant measures at the gas purification, thereby further enhancing the economics of the process.

At the process according to FIG. 4, an additional post-drying tower 24 is provided upstream of the pre-contact 15, thus enabling a further increase of the portion of the superior quality acid.

Figure 5:
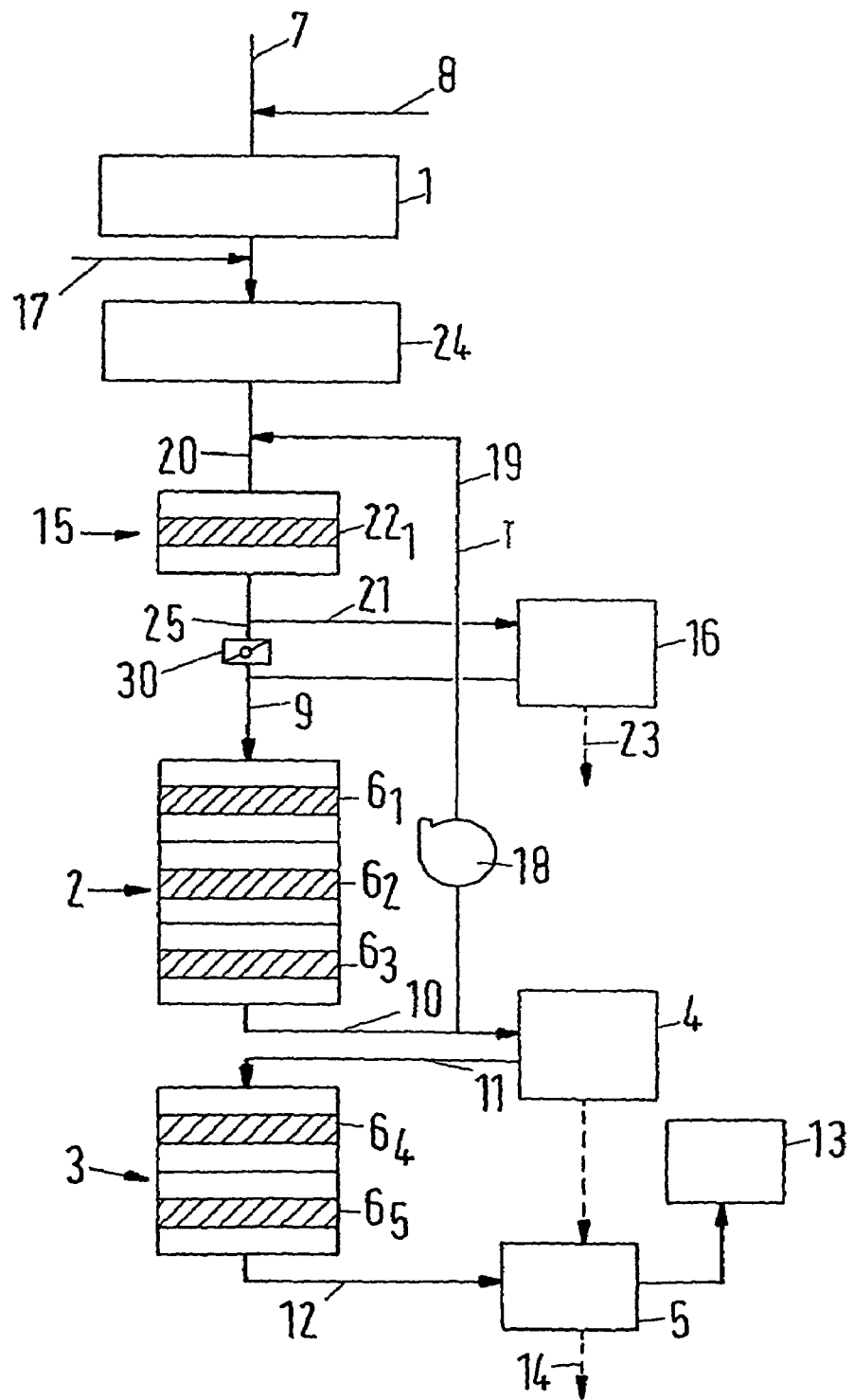
FIG. 5 shows a process diagram of a process and a plant according to a fourth embodiment of the present invention.

In the system shown in FIG. 5, compared to the one of FIG. 4, a bypass line 25 with an adjustable valve 30 or the like is provided between the pre-contact 15 and the first main contact 2 (primary contact), through which (bypass line) a part of the process gases originating from the pre-contact 15 can be led, past pre-absorber 16, into the downstream contact stage 2 of the conventional system, thereby enabling the portion of superior quality sulphuric acid to be further raised compared to the process shown in FIG. 4, namely up to 60%. By installing a second gas drying tower 24, the portion of superior-quality acid can be further increased.

Figure 6:
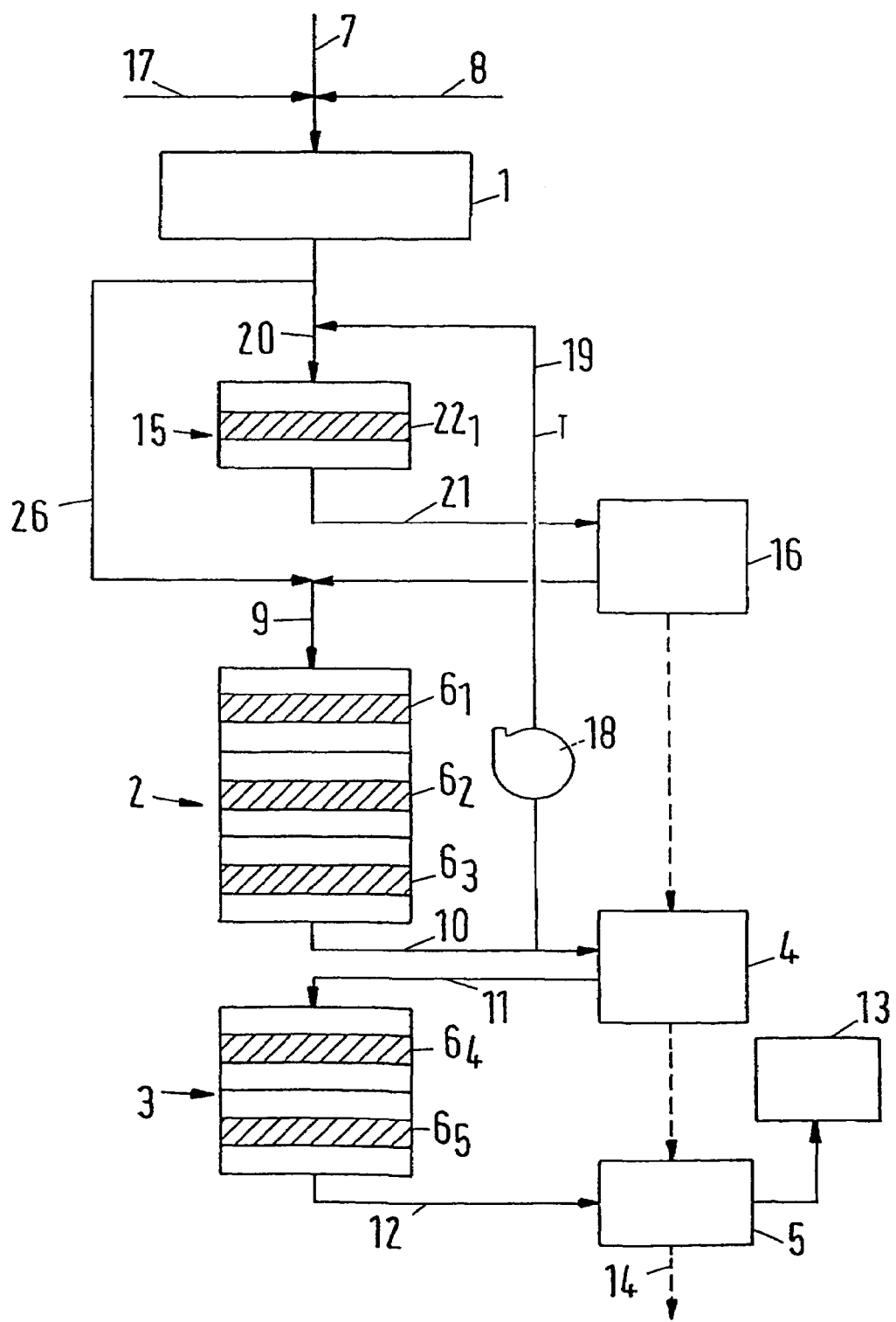
FIG. 6 shows a process diagram of a process and a plant according to a fifth embodiment of the present invention.

The system shown in FIG. 6 varies from the embodiment according to FIG. 2, in that a bypass line 26 is provided leading around the pre-contact 15 and the pre-absorber 16, via which (bypass line) the feed gas, in whole or in part, downstream the pre-heating, can be directly passed to the first main contact (2) (primary contact), as is the case in a conventional system.

A process design of this type is of advantage, when the system is operated, over a certain period of time, with feed gases of different sulphur dioxide concentrations. In particular, off-gases generated during the pyrometallurgical, conversion of e.g. white metal to blister, contain low $SO_2$ concentrations (e.g. 5-15% by volume $SO_2$). Such gases of lower concentration are generated, subject to the metallurgical process applied and either occur as periodic/discontinuous flows (batch process, e.g. Peirce Smith Converter), or continuous flows (e.g. Outokumpu Flash Converter),with the continuously operating metallurgical processes employing oxygen-enriched air, also yielding off-gases of a higher concentration of sulphur dioxide between 20 and 30% by volume.

When processing gases of a low concentration, e.g. feed gases with up to about 13% by volume or less sulphur dioxide, too much sulphur dioxide would be oxidized in the precontact stage 15, with the result that the process gas supplied to the first main contact 2 (primary contact) would have an $SO_2$ concentration insufficient for autothermal operation, i.e. the residual $SO_2$ concentration would be too low to maintain the heat balance.

As opposed thereto, in the system according to the present embodiment also low-concentration feed gases can be processed attaining satisfactory results, by passing only such an amount of $SO_2$-containing gas to the pre-contact 15 as is required in order to obtain an inlet gas to the first main contact stage $6_1$ (primary contact) of no less than 5-6% by volume of sulphur dioxide, whereas the latter gas is formed after combining the partial stream passed through bypass line 26 and the partial stream led through pre-contact 15. In this process design, the gas re-circulation is continued and through the ongoing supply of $SO_2$-containing gas, the pre-contact 15 is maintained at the required reaction temperature. This is of advantage to potential subsequent processing of high-concentration gases. The amount of gas which flows to bypass line 26 can be controlled by the desired sulphur dioxide concentration of gas fed to the first main contact stage (primary contact), while the re-circulation flow being reduced to a minimum.

Figure 7:
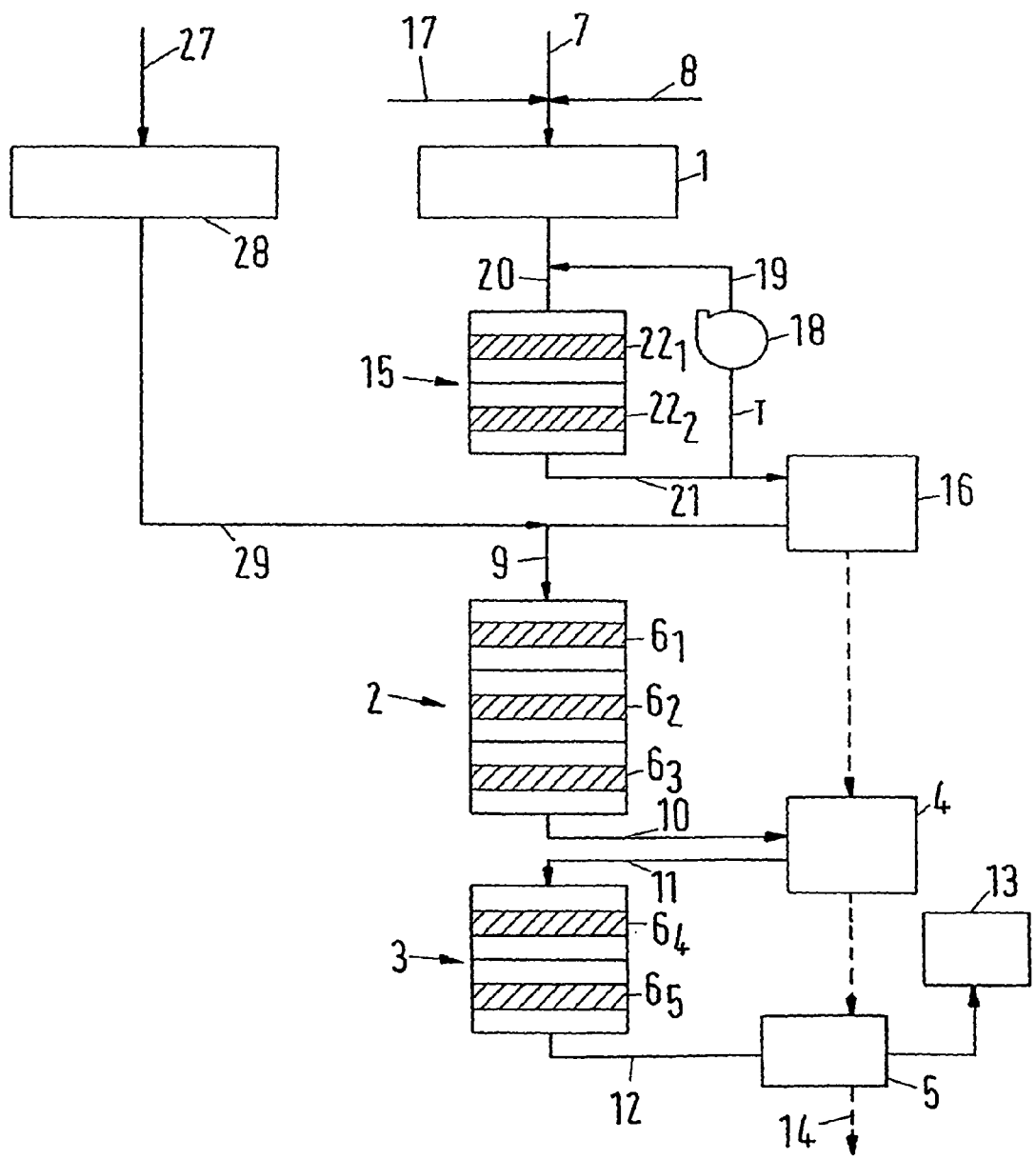
FIG. 7 shows a process diagram of a process and a plant according to a sixth embodiment of the preset invention.

In the plant as shown in FIG. 7, the pre-contact arrangement, i.e. pre-contact 15, pre-absorber 16 and re-circulation line 19, are completely de-coupled from the conventional system arranged downstream. In addition, the process comprises a separate supply system consisting of a feed-gas line 27, a gas drying tower 28 and a heat exchanger (not shown) for feed gases of a low sulphur dioxide content which are fed directly to the first main contact 2 (primary contact). Hence it is possible in this embodiment, to simultaneously process a high-concentration and a low-concentration gas, in that the high-concentration feed gas, e.g. originating from a Cu-smelter, is first passed through pre-contact 15 and the downstream pre-absorber 16, prior to combining the so generated process gas of lower sulphur dioxide content, with the low-concentration feed gas supplied via line 29, e.g. originating from Peirce-Smith converter, and feeding this combined gas to the main contact 2 (primary contact). By controlling the re-circulation gas flow, the gas exit temperature at the pre-contact can be maintained at a temperature below 640° C. and also the $SO_2$ concentration at the inlet to the main contact 2 (primary contact) can be manipulated.

Figure 8:
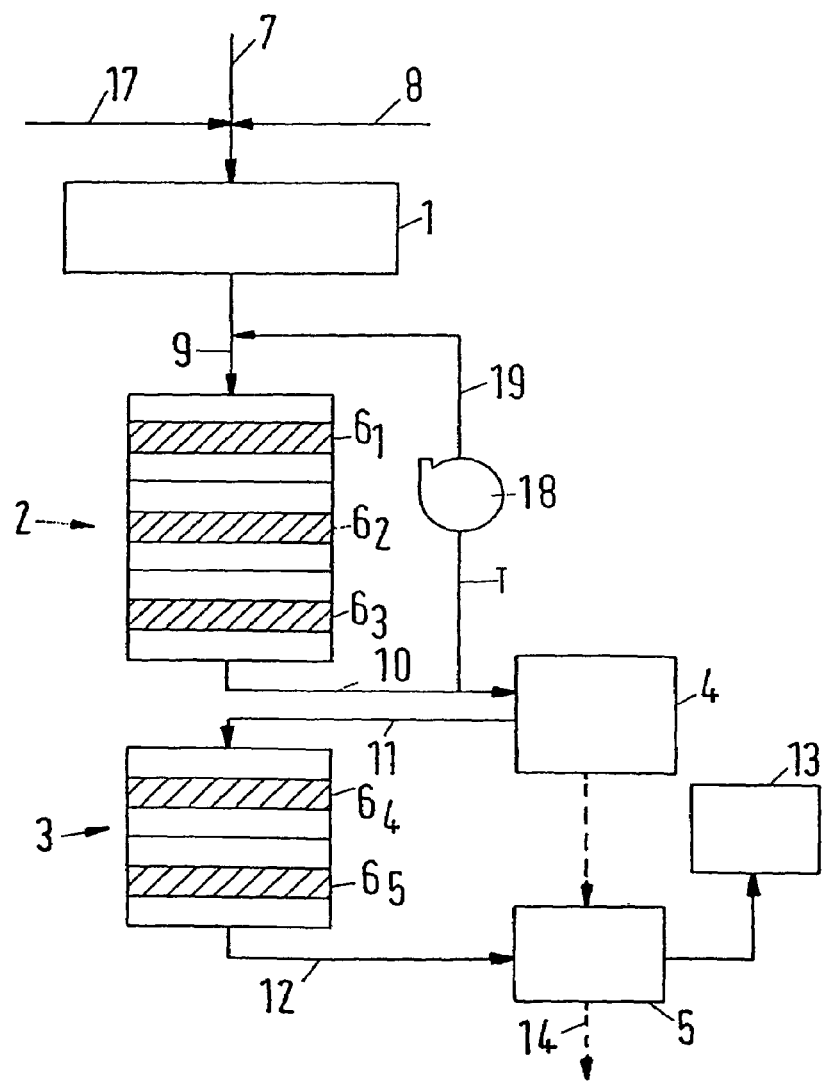
FIG. 8 shows a process diagram of a process and a plant according to a seventh embodiment of the present invention.

As opposed to the previously described forms of embodiment of the invention, the arrangement shown in FIG. 8 has no pre-contact 15 but is distinguished from the conventional arrangement by the re-circulation line 19 furnished with a hot gas blower 18 and a feed-in line 17 for technical oxygen arranged upstream of the gas drying tower 1.

In this process the dried and pre-heated mixture of high-concentration feed gas, technical oxygen, dilution air and re-circulation gas which, in the practice of the invention, contains more than 13% by volume of $SO_2$, is directly admitted to the main contact 2 (primary contact) and is conducted through the individual contact stages $6_1$ through $6_5$ of both main contacts 2, 3, with intermediate cooling between the individual stages 6 and intermediate absorption of the sulphur trioxide at the intermediate absorber 4 being effected. Preferably, the gas streams are so adjusted that the process gas supplied to the first contact stage $6_1$ contains a sulphur dioxide content between 13 and 20% by volume and an oxygen content between 7 and 20% by volume. The exit temperature of the process gas exiting the first contact stage $6_1$ can again be adjusted by the amount of re-circulating gas, so that a value of 640° C. is not exceeded. Although the $SO_2$ emission in this process design will be slightly higher than in the one according to FIG. 1, it still meets applicable environmental protection regulations.

As an option, the system can be furnished with an additional gas scrubbing system, whereas the gas discharged from the final absorber 5, prior to entering the stack 13, is subjected to a so-called tail gas scrubbing system. Suitably, hydrogen peroxide $H_2O_2$ (Peracidox Process) or other common alkaline processes are employed, using ammonia $NH_3$ or sodium hydroxide NaOH as an agent to neutralize $SO_2$. This can compensate for the disadvantage of the initially higher $SO_2$ emission at users discretion or in accordance with statutory requirements.

This arrangement produces about 30% more sulphuric acid per unit of time as compared to the conventional system as shown in FIG. 1, with a virtually identical gas flow being passed through the main contact 2 (primary contact). As the additional equipment is restricted to the re-circulation line 19 and the feed-line 17 for technical oxygen, the capital costs for the re-furbishing of a conventional plant are substantially lower than the costs involved with a conventional new system of 30% capacity.

In analogy thereto, also the cost of a new plant according to the invention of an equivalent capacity are significantly lower than those of a conventional new plant designed for the same capacity. Setting the capital cost at 100% for a new conventional plant, a new plant of an increased capacity by 30% would cost approximately 120%, while the cost involved with a system according to the present embodiment would amount to approximately 110% only.

Apart from the lower investment cost, another advantage of the system according to the invention is the significantly lower operating cost, which is due to a lower specific electric energy demand and to a higher specific recovery of thermal energy. Thus, in addition to the lower operating costs, the process of the invention results in substantially reduced capital costs and, hence, in significantly reduced total manufacturing or processing cost of the produced sulphuric acid.

Figure 9:
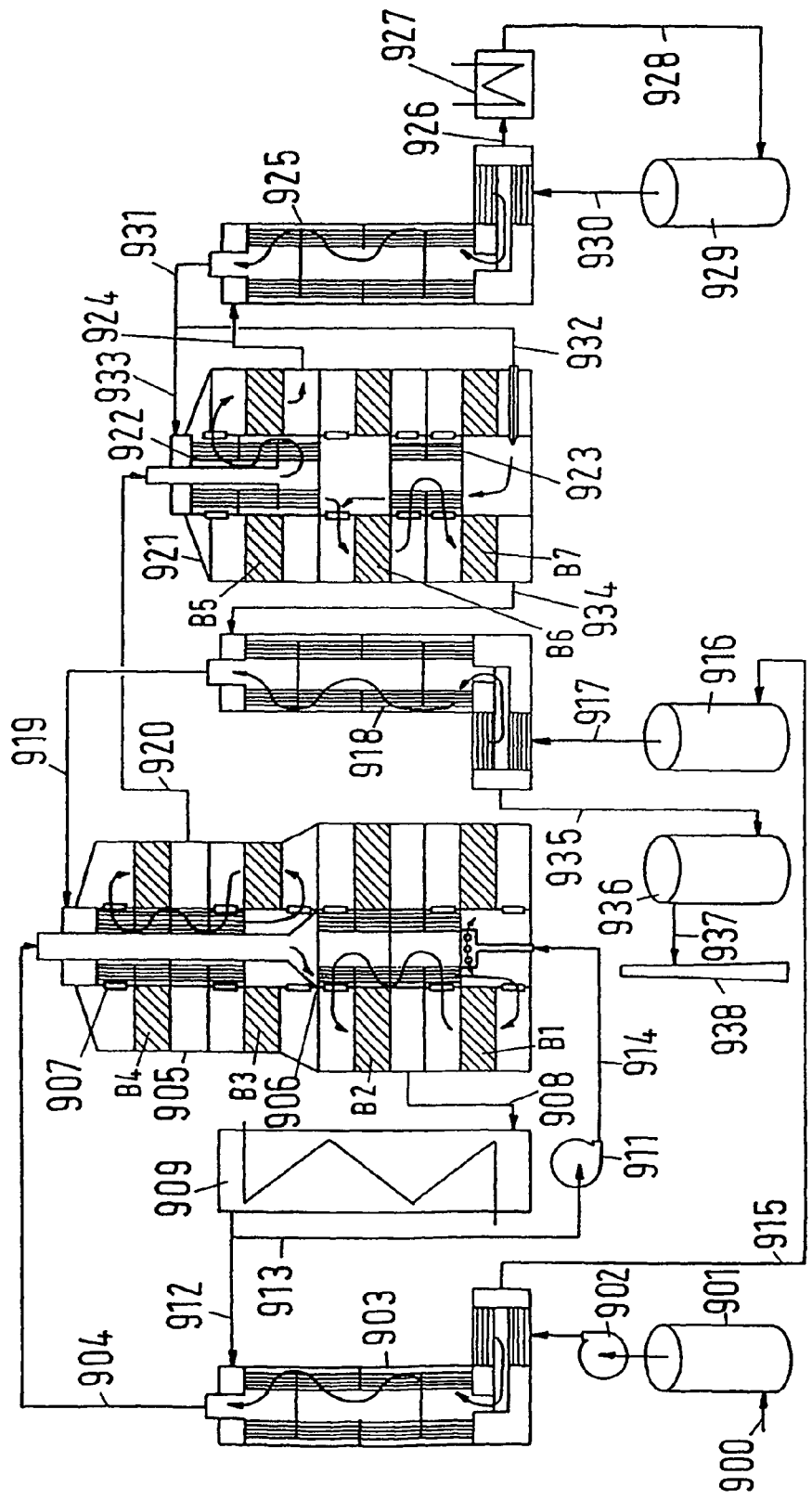
FIG. 9 shows a typical and practical embodiment of the process of the invention with details of the intermediate cooling and energy management of the system.

FIG. 9 shows a typical and practical embodiment of the process of the invention with details of the intermediate cooling and energy management of the system.

Purified gas from a wet gas cleaning system 900 is fed into the gas drying tower 901 (80.900 Nm³/h; 22.25% by volume of $SO_2$; 12.39% by volume of $O_2$) with an $O_2/SO_2$ molar ratio of only 0.557, i.e. slightly above the stoichiometric requirement of 0.5. By means of a main blower 902, the gas is pressurized to an extent adequate to overcome the entire gas resistance of the system arranged downstream. The gas enters the heat exchanger 903 at a temperature of 100° C. This heat exchanger is preferably designed as a combination of a horizontal sacrificial part vertical main exchanger. The gas is heated therein to about 154° C. before entering into the converter vessel 905 (pre-contact 15) via gas duct 904. It is then passed into the tube side of the heat exchanger 906 from where it exists at a temperature of 452° C. In the bottom portion, this gas is mixed with re-circulating gas from line 914, before the resulting gas mixture is fed to the first pass (layer) (B1) of the pre-contact 15. The mixed gas amounts to 105.900 Nm³/h (18.45% by volume of $SO_2$; 10.47% by volume of $O_2$; 4.29% by volume of $SO_3$) fed to the said pass (layer) (B1).

The gas enters the first pass (layer) (B1) from below, leaving the same at a temperature of 639° C. prior to entering the shell side of the internal heat exchanger 906 wherein the gas, prior to entering the second pass (layer) of the pre-contact (B2), is cooled down to 445° C. In this pass (layer), the gas is heated to 561° C., leaving the converter vessel 905 through the gas duct 908 and entering the steam boiler 909. Part of the heat is removed from the system and used for the generation of steam. The gas is leaving the boiler at a temperature of 211° C. Through the duct 903, a small portion of the said gas (25.000 Nm$^3$/h), is supplied to the re-circulation blower 911 and further via duct 914 to the said bottom portion for mixing prior to entering the first pass (layer) (B1).

In parallel to the boiler 909, the remainder of the gas (74.047 Nm$^3$/h), is passed via duct 912 into the afore-mentioned heat exchanger 903, cooled therein to 170° C. and fed to pre-absorber 916 through duct 915. The $SO_3$ (18.17% by volume) contained therein is absorbed, with the absorber in view of the high $SO_3$ concentration, preferably being designed as a venturi-type absorber. Through absorption of $SO_3$, the gas volume is reduced to 60.595 Nm$^3$/h (7.54% by volume of $SO_2$; 5.20% by volume of $O_2$). By comparison, the gas flow at duct 917 is now only about 57% of the gas flow through the pre-contact (B1).

The gases leave the pre-absorber at a temperature of 80° C. via the duct 917 to be pre-heated in the subsequent heat exchanger 918, preferably designed as split vessels similar to 903. The converter vessel 905 can be of a substantially smaller diameter in the area of the passes (layers) (B3) and (B4), as the amount of gas is substantially lower than compared to passes (B1) and (B2). The gas pre-heated to 282° C. is now re-introduced through duct 919 into the converter vessel 905 to be heated in the tube side of the internal heat exchanger 907 to the required inlet temperature of 425° C. for the first contact pass (layer) (B3) of the primary contact. The gas flows through the said catalyst pass (B3), preferably, from the bottom to the top from where it is discharged at a temperature of 573° C. The gas is then cooled at the shell side of the heat exchanger 907 to a temperature of 440° C. which is suitable for entering the second pass (layer) of the primary contact (B4). Continuing catalysis is heating up the gas to 488° C. prior of being discharged through duct 920 from the converter vessel 905, and fed to the second converter vessel 921. The gas is conducted to the shell side of the internal heat exchanger 922 and cooled therein to 430° C. before entering the third contact pass (layer) of the primary contact (B5). The gas leaves this pass at 445° C. and is discharged from the converter vessel 921 through line 924 into the heat exchanger 925, preferably designed as a split vessel similar to 903.

The gas, in heat exchanger 925, is cooled to 237° C. before admitted, via duct 926, to the economizer 927 where excessive heat is removed again from the system and preferably converted to water or steam. After cooling in the economizer 927 to 170° C., the gas, via duct 928, is passed into the intermediate absorber 929 where the generated $SO_3$ is absorbed (7.35% by volume of $SO_3$). Removed from $SO_3$, the gas leaves the intermediate absorber 929 at a temperature of 80° C. via duct 930 at a flow rate of 54.119 Nm$^3$/h (0.51% by volume of $SO_2$; 1.77% by volume of $O_2$) to be fed to the heat exchanger 925 for being pre-heated for the subsequent post- or secondary contact.

The gas leaves the heat exchanger 925 at a temperature of 316° C. via duct 931. Prior to re-entering the converter vessel 921, the gas is split into two partial streams 932 and 933. The first partial gas stream 933 is heated to 410° C. at the tube side of the internal heat exchanger 922, while the second partial stream 932 in the internally arranged heat exchanger 923 is also heated at the tube side to 410° C. The two partial streams are re-combined in the converter vessel 921 before being fed to the first pass (layer) of the secondary contact (B6).

After passing through the said catalyst stage, the gas, at a temperature of 426° C., enters the internal heat exchanger at the shell side thereof, where it is cooled, prior to entering the second pass (layer) of the secondary contact (B7), to a temperature of 410° C. The further conversion of the residual $SO_2$ will result in a temperature increase of less than 1° C. and the gas subsequently exits the converter vessel 921 through duct 934 at a temperature of 410° C.

The gas is now fed to the heat exchanger 918 where it is cooled to a temperature of 172° C. to be passed thereafter, through duct 935, into the final absorber 936 where the residual $SO_3$ (0.5% by volume of $SO_3$) is absorbed, with the gas then being discharged to the atmosphere at a temperature of 80° C. via duct 937 and stack 938. The gas flow here amounts 53.707 Nm$^3$/h with a theoretical residual content of $SO_2$ of 170 ppm vol. corresponding to 0.33 t $SO_2$ per t $H_2SO_4$.

The invention will now be described with reference to seven examples demonstrating but not restricting the inventive idea, and a comparative example.

In all examples and in the comparative example the same pyrometallurgically generated feed gas of the following composition has been used:

36% by volume of $SO_2$ 4.5% by volume of $O_2$

2% by volume of $CO_2$ 57.5% by volume of $N_2$

To that extent the feed gas in the reference example 1 has been processed to generate sulphuric acid in a state-of-the-art plant according to FIG. 1, and in examples 2 through 8 it has been processed to generate sulphuric acid in a plant of the invention corresponding to the Figure having the respective number.

The volume flows and compositions of the relevant gas streams at the individual plant sections, and the amounts of generated sulphuric acid and absorbed sulphur trioxide are summarized in Table 1, with the numbers set out in column 1 of Table 1 with respect to the individual substance streams corresponding to the reference characters of the plant sections used in the drawings, such as ducts/lines, absorbers etc., through which the corresponding streams are passed.

Table 2 in respect of the individual examples presents the temperatures in the individual contact passes/layers and the respective conversions of the oxidation reaction.

Finally, Table 3 in respect of the individual examples summarizes the specific consumptions of utilities and emissions.

As demonstrated in Table 1, all processes carried out in the practice of the invention, except for example 6, produce more sulphuric acid per unit of time than the prior-state-of-art process. This is attributed particularly to the fact that in the process of the invention, in view of the lower gas dilution requirement, an amount of feed gas 50% higher compared to the process of reference example 1 can be processed per unit of time.

As revealed by Table 2, the gas exit temperature in the examples of the invention also in the respectively first contact pass/layer in which contact gas having a sulphur dioxide content of more than 13% by volume is applied, can be readily adjusted below a value critical in respect of the vanadium pentoxide catalyst, with the control, in particular, being effected by adjusting the quantity of re-circulation gas.

Finally, Table 3 shows that in almost all examples of the invention, the operating costs were below those of the reference example. In particular, a significantly higher specific heat recovery could be achieved by the processes of examples 2 through 5 and 8. At the same time, the specific emission values also were below those of the reference example.

List of Reference Characters 1. gas drying tower
2. first main contact (primary contact)
3. second main contact (secondary contact)
4. intermediate absorber
5. final absorber
6. main contact stage
7. gas duct/line leading to the gas drying tower
8. feed line for diluting air
9. feed line leading to the first main contact (primary contact)
10. gas duct/line leading to the intermediate absorber
11. feed line leading to the second main contact (secondary contact)
12. duct/line leading to the final absorber
13. stack
14. product discharge line
15. pre-contact
16. pre-absorber
17. feed line for technical oxygen
18. hot gas blower
19. re-circulation duct/line
20. feed line leading to the pre-contact
21. gas duct/line leading to the pre-absorber
22. pre-contact stage
23. discharge duct/line from the pre-absorber
22. pre-contact stage
23. discharge duct/line from the pre-absorber
24. post drying tower
25. bypass duct/line around the pre-absorber
26. bypass duct/line around the pre-contact
27. feed line for feed gas containing less than 13% by volume of $SO_2$
28. secondary gas drying tower
29. feed line
30. valve T re-circulating partial stream

TABLE 1

(Gas Data)

| No. | | Comparative Example 1 | Example 2 | Example 3 | Example 4 | Example 5 | Example 6 | Example 7 | Example 8 |
|---|---|---|---|---|---|---|---|---|---|
| | Starting Gas (Pyrometallurgical rich gas) Concentrations: | | | | | | | | |
| | $SO_2$ (% by vol.) | 36 | 36 | 36 | 36 | 36 | 14 | 36 | 36 |
| | $O_2$ (% by vol.) | 4.5 | 4.5 | 4.5 | 4.5 | 4.5 | 4.5 | 4.5 | 4.5 |
| | $CO_2$ (% by vol.) | 2 | 2 | 2 | 2 | 2 | 2 | 2 | 2 |
| | $N_2$ (% by vol.) | 57.5 | 57.5 | 57.5 | 57.5 | 57.5 | 79.5 | 57.5 | 57.5 |
| | Volume flow | | | | | | | | |
| | $Nm^3/h$ | 50000 | 75000 | 75000 | 75000 | 75000 | 75000 | 50000 | 65000 |
| 8 | Diluting air | | | | | | | | |
| | $Nm^3/H$ | 97000 | 25000 | 24000 | 25000 | 25000 | 24000 | 25000 | 51000 |
| 17 | Techn. oxygen (90% $O_2$) | | | | | | | | |
| | $Nm^3/H$ | 0 | 7900 | 7300 | 7900 | 7900 | 0 | 0 | 5300 |
| 4 | Gas after gas dryer | | | | | | | | |
| | $SO_2$ (% by vol.) | 12.24 | 25.02 | 25.4 | 25.02 | 25.02 | 10.61 | 24 | 19.29 |
| | $O_2$ (% by vol.) | 15.32 | 14.56 | 14.07 | 14.56 | 14.56 | 8.48 | 9.97 | 15.13 |
| | $CO_2$ (% by vol.) | 0.68 | 1.39 | 1.41 | 1.39 | 1.39 | 1.52 | 1.33 | 1.07 |
| | $N_2$ (% by vol.) | 71.75 | 59.03 | 59.11 | 59.03 | 5903 | 79.04 | 64.7 | 64.51 |
| | $Nm^3/h$ | 147000 | 107900 | 106300 | 107900 | 107900 | 99000 | 75000 | 121300 |
| | $O_2/SO_2$ | 1.25 | 0.58 | 0.55 | 0.58 | 0.58 | 0.80 | 0.6227381 | 0.78 |
| 19 | Recirculation gas | | | | | | | | |
| | $SO_2$ (% by vol.) | — | 0.7 | 7.15 | 0.7 | 1.26 | 0.42 | 8.54 | 1.67 |
| | $SO_3$ (% by vol.) | — | 10.69 | 20.99 | 10.69 | 16.63 | 8.94 | 17.64 | 19.57 |
| | $O_2$ (% by vol.) | — | 2.86 | 4.86 | 2.86 | 2.95 | 3.50 | 1.85 | 6.64 |
| | $CO_2$ (% by vol.) | — | 1.97 | 1.56 | 1.97 | 1.82 | 1.63 | 1.45 | 1.18 |
| | $N_2$ (% by vol.) | — | 83.77 | 65.44 | 83.77 | 77.35 | 85.5 | 70.52 | 70.94 |
| | $Nm^3/h$ | — | 52000 | 44000 | 52000 | 43000 | 6000 | 22000 | 27000 |
| 20 | Gas to precontact | | | | | | | | |
| | $SO_2$ (% by vol.) | — | 17.11 | 20.06 | 17.11 | 18.25 | 8.24 | 20.49 | — |
| | $O_3$ (% by vol.) | — | 3.48 | 6.15 | 3.48 | 4.75 | 2.08 | 4 | — |
| | $O_2$ (% by vol.) | — | 10.75 | 11.38 | 10.75 | 11.25 | 7.32 | 8.13 | — |
| | $CO_2$ (% by vol.) | — | 1.58 | 1.46 | 1.58 | 1.51 | 1.54 | 1.36 | — |
| | $N_2$ (% by vol.) | — | 67.08 | 60.97 | 67.08 | 64.25 | 80.82 | 66.02 | — |
| | $Nm^3/h$ | — | 159900 | 150300 | 159900 | 150900 | 25800 | 97000 | — |
| 9 | Gas to main contact (primary contact) | | | | | | | | |
| | $SO_2$ (% by vol.) | 12.24 | 10.79 | 9.05 | 10.79 | 11.47 | 8.94 | 9.02 | 16.08 |
| | $SO_3$ (% by vol.) | 0 | 0 | 0 | 0 | 5.46 | 0 | 0 | 3.56 |
| | $O_2$ (% by vol.) | 15.32 | 7.89 | 6.15 | 7.89 | 8.05 | 7.72 | 7.76 | 13.59 |
| | $CO_2$ (% by vol.) | 0.68 | 1.87 | 1.98 | 1.87 | 1.73 | 1.56 | 0.94 | 1.09 |

TABLE 1-continued (Gas Data)

| No. | | Comparative Example 1 | Example 2 | Example 3 | Example 4 | Example 5 | Example 6 | Example 7 | Example 8 |
|---|---|---|---|---|---|---|---|---|---|
| | N2 (% by vol.) | 71.75 | 79.45 | 82.83 | 79.45 | 73.29 | 81.78 | 82.28 | 65.68 |
| | Nm³/h | 147000 | 134999 | 75869 | 134999 | 132280 | 102394 | 106673 | 148300 |
| 11 | Gas to second main contact (secondary contact) | | | | | | | | |
| | SO2 (% by vol.) | 0.58 | 0.79 | 0.65 | 0.79 | 1.51 | 0.47 | 0.48 | 2.07 |
| | SO3 (% by vol.) | 0 | 0 | 0 | 0 | 0 | 0 | 0 | 0 |
| | O2 (% by vol.) | 11.32 | 3.2 | 2.07 | 3.2 | 3.54 | 3.85 | 3.85 | 8.26 |
| | CO2 (% by vol.) | 0.83 | 2.21 | 2.27 | 2.21 | 2.18 | 1.79 | 1.08 | 1.47 |
| | N2 (% by vol.) | 87.28 | 93.8 | 95.01 | 93.8 | 92.77 | 93.9 | 94.59 | 88.2 |
| | Nm³/h | 120852 | 67898 | 66142 | 67898 | 68656 | 83720 | 92794 | 88711 |
| | Offgas to Stack | | | | | | | | |
| | Nm³/h | 119807 | 67109 | 65110 | 67109 | 67123 | 83142 | 92140 | 85967 |
| | SO2 (ppm) | 145 | 194 | 201 | 194 | 306 | 100 | 102 | 270 |
| | Reaction % | 99.91 | 99.95 | 99.95 | 99.95 | 99.92 | 99.92 | 99.96 | 99.90 |
| 14 | H2SO4, standard quality t/d | 1935 | 2902 | 2902 | 1973 | 1321 | 1128 | 2338 | 2514 |
| 23 | H2SO4, superior quality t/d | — | — | — | 929 | 1580 | — | — | — |
| 16 | SO3 absorbed (preabsorber) kg/h | — | 6711 | 73641 | 67111 | 44958 | 6967 | 44349 | — |
| 4 | SO3 absorbed (intermediate absorber) kg/h | 63276 | 29688 | 23537 | 29688 | 50050 | 30010 | 33586 | 78862 |
| 5 | SO3 absorbed (final absorber) kg/h | 2529 | 1910 | 1529 | 1910 | 3711 | 1397 | 1582 | 6641 |
| 26 | Bypass pre-contact | | | | | | | | |
| | SO2 (% by vol.) | — | — | — | — | — | 10.61 | — | — |
| | O2 (% by vol.) | — | — | — | — | — | 8.48 | — | — |
| | CO2 (% by vol.) | — | — | — | — | — | 1.52 | — | — |
| | N2 (% by vol.) | — | — | — | — | — | 79.4 | — | — |
| | Nm³/h | — | — | — | — | — | 79200 | — | — |
| 25 | Bypass preabsorber Nm³/h pyrometallurgical lean gas Concentrations | — | — | — | — | 53498 | — | — | — |
| | SO2 (% by vol.) | — | — | — | — | — | — | 7.5 | — |
| | O2 (% by vol.) | — | — | — | — | — | — | 14 | — |
| | CO2 (% by vol.) | — | — | — | — | — | — | 0 | — |
| | N2 (% by vol.) | — | — | — | — | — | — | 78.5 | — |
| | Volume flow Nm³/h | — | — | — | — | — | — | 40000 | — |

TABLE 2

(Converter Temperatures and Conversions)

| | | Comparative Example 1 | Example 2 | Example 3 | Example 4 | Example 5 | Example 6 | Example 7 | Example 8 |
|---|---|---|---|---|---|---|---|---|---|
| Pre-contact | | | | | | | | | |
| 1st stage (entrance) | T (° C.) | — | 430 | 425 | 430 | 430 | 425 | 425 | — |
| | Conversion SO2 (%) | — | 16.9 | 23.4 | 16.9 | 20.6 | 20.1 | 16.3 | — |
| 1st stage (exit) | T (° C.) | — | 640 | 640 | 640 | 640 | 577 | 639 | — |
| | Conversion SO2 (%) | — | 55.7 | 56.2 | 55.7 | 56.3 | 71.6 | 49.6 | — |
| 2nd stage (entrance) | T (° C.) | — | — | 445 | — | — | — | 445 | — |
| | Conversion SO2 (%) | — | — | 56.2 | — | — | — | 49.6 | — |
| 2nd stage (exit) | T (° C.) | — | — | 565 | — | — | — | 557 | — |
| | Conversion SO2 (%) | — | — | 74.6 | — | — | — | 67.4 | — |
| Primary contact | | | | | | | | | |
| 1st stage (entrance) | T (° C.) | 425 | 425 | 425 | 425 | 425 | 425 | 425 | 425 |
| | Conversion SO2 (%) | 0 | 0 | 0 | 0 | 32.2 | 0 | 0 | 18.1 |
| 1st stage (exit) | T (° C.) | 640 | 610 | 590 | 610 | 588 | 595 | 596 | 640 |
| | Conversion SO2 % | 62.2 | 59.9 | 62.6 | 59.9 | 68.1 | 65.3 | 64.9 | 59.7 |
| 2nd stage (entrance) | T (° C.) | 445 | 440 | 435 | 440 | 440 | 440 | 440 | 445 |
| | Conversion SO2 % | 62.2 | 59.9 | 62.6 | 59.9 | 68.1 | 65.3 | 64.9 | 59.7 |
| 2nd stage (exit) | T (° C.) | 534 | 517 | 498 | 517 | 517 | 501 | 502 | 556 |
| | Conversion SO2 (%) | 87.7 | 84.4 | 86.1 | 84.4 | 84.9 | 88.4 | 88.2 | 81.1 |
| 3rd stage (Entrance) | T (° C.) | 435 | 430 | 430 | 430 | 430 | 430 | 430 | 435 |
| | Conversion SO2 % | 87.7 | 84.4 | 86.1 | 84.4 | 84.9 | 88.4 | 88.2 | 81.1 |

TABLE 2-continued (Converter Temperatures and Conversions)

| | | Comparative Example 1 | Example 2 | Example 3 | Example 4 | Example 5 | Example 6 | Example 7 | Example 8 |
|---|---|---|---|---|---|---|---|---|---|
| 3rd stage (Exit) Secondary contact | T (° C.) | 464 | 460 | 450 | 460 | 467 | 449 | 449 | 493 |
| | Conversion SO2 % | 95.0 | 93.8 | 93.7 | 93.8 | 93.0 | 95.5 | 95.4 | 92.1 |
| 4th stage (entrance) | T (° C.) | 415 | 415 | 415 | 415 | 415 | 415 | 415 | 405 |
| | Conversion SO2 (%) | 0 | 0 | 0 | 0 | 0 | 0 | 0 | 0 |
| 4th stage (exit) | T (° C.) | 433 | 439 | 435 | 439 | 450 | 429 | 430 | 467 |
| | Conversion SO2 (%) | 98 | 95.7 | 95.1 | 95.7 | 94.6 | 96.9 | 96.9 | 95.2 |
| 5th stage (entrance) | T (° C.) | 410 | 410 | 410 | 410 | 410 | 410 | 410 | 400 |
| | Conversion SO2 (%) | 98 | 95.7 | 95.1 | 95.7 | 94.6 | 96.9 | 96.9 | 95.2 |
| 5th stage (exit) | T (° C.) | 411 | 411 | 411 | 411 | 412 | 410 | 410 | 402 |
| | Conversion SO2 (%) | 98.0 | 97.6 | 97 | 97.6 | 98.0 | 97.9 | 97.9 | 98.7 |
| Overall Conversion: | % | 99.91 | 99.95 | 99.95 | 99.95 | 99.92 | 99.92 | 99.96 | 99.90 |

TABLE 3

(Specific Data)

| | | Comparative Example 1 | Example 2 | Example 3 | Example 4 | Example 5 | Example 6 | Example 7 | Example 8 |
|---|---|---|---|---|---|---|---|---|---|
| Specific electrical. energy requirements | (kWh/t H2SO4) | 55 | 52 | 45 | 54 | 52 | 73 | 49 | 45 |
| Specific heat recovery from gas | (kWh/t H2SO4) | 123 | 165 | 187 | 165 | 184 | 81 | 96 | 185 |
| Specific cooling water requirements | (m³/t H2SO4) | 37 | 32 | 30 | 32 | 31 | 42 | 33 | 31 |
| Specific SO2 emission | (kg SO2/t H2SO4) | 0.63 | 0.65 | 0.32 | 0.32 | 0.32 | 0.50 | 0.52 | 0.28 |
| Specific SO3 emission | (kg SO3/t H2SO4) | 0.045 | 0.025 | 0.017 | 0.016 | 0.017 | 0.017 | 0.053 | 0.028 |

The invention claimed is:

1. A process for the production of sulphuric acid, comprising reacting a sulphur dioxide-containing feed gas, at least in part, with oxygen in at least two contact stages of main contacts, arranged in series, to generate sulphur trioxide, feeding the generated sulphur trioxide-containing gas to an absorber and reacting said sulphur trioxide-containing gas therein to form sulphuric acid, withdrawing a partial stream of the sulphur dioxide and sulphur trioxide-containing gas from a contact stage located upstream of the last main contact stage, mixing said partial stream with the feed gas to form a contact gas having a sulphur dioxide content of more than 13% by volume, and returning said mixed partial stream to the first contact stage, wherein the contact stages contain a catalyst and wherein the partial stream withdrawn from the contact stage located upstream of the last main contact stage has a sulphur trioxide content of from about 9% by volume to about 21% by volume.

2. The process according to claim 1, wherein the contact gas has a sulphur dioxide content of between 14 and 25% by volume.

3. The process according claim 1, wherein air and/or technical oxygen is supplied to the feed gas prior to being mixed with the partial stream, and wherein the O₂ to SO₂ ratio in the contact gas, based on the volumetric portions thereof, is adjusted to less than 1.2.

4. The process according to claim 3, wherein the volumetric portion of the partial stream supplied to the feed gas amounts to between 15 and 35% of the contact gas.

5. The process according to claim 1, further comprising providing a pre-contact upstream from the main contact to which the contact gas is fed, withdrawing a process gas containing no more than 13% by volume of sulphur dioxide from the pre-contact, and supplying said process gas to the first contact stage of the main contact.

6. The process according to claim 5, wherein the pre-contact comprises one or two pre-contact stages.

7. The process according to claim 5, wherein the process gas discharged from the pre-contact, prior to being introduced into the main contact is passed through a pre-absorber.

8. The process according to claim 5, wherein the process gas discharged from the first main contact, prior to being introduced into the second main contact is supplied to an intermediate absorber.

9. The process according to claim 5, wherein the process gas discharged from the second main contact is supplied to a final absorber.

10. The process according to claim 5, further comprising conducting at least part of the process gas discharged from the pre-contact via a bypass line past a pre-absorber directly into the main contact.

11. The process according to claim 9, wherein the gas discharged from the final absorber is subjected to gas scrubbing with hydrogen peroxide, ammonia or sodium hydroxide forming the neutralizing agent for the sulphur dioxide.

12. The process according to claim 9, wherein the partial stream, prior to being returned to the first contact stage, is cooled to a temperature of less than 500° C.

13. The process according to claim 9, wherein the amount of the gas re-circulated as the partial stream is adjusted on the basis of the temperature at which the gas leaves the first contact stage.

14. A process for the production of sulphuric acid, comprising reacting a sulphur dioxide-containing feed gas, at least in part, with oxygen in at least two contact stages of main contacts, arranged in series, to generate sulphur trioxide, feeding the generated sulphur trioxide-containing gas to an absorber and reacting said sulphur trioxide-containing gas therein to form sulphuric acid, withdrawing a partial stream of the sulphur dioxide and sulphur trioxide-containing gas from a contact stage located upstream of the last main contact stage, wherein the partial stream has a sulphur trioxide content of from about 9% by volume to about 21% by volume, mixing said partial stream with the feed gas so as to form a partial stream and feed gas mixture having a sulphur dioxide content of more than 13% by volume and feeding the mixture into a pre-contact upstream from the main contact, withdrawing a process gas from the pre-contact, and supplying said process gas to the first contact stage of the main contact, wherein the contact stages and the pre-contact contain a catalyst.

15. The process according to claim 14, wherein the process gas contains no more than 13% by volume of sulphur dioxide.

16. The process according claim 14, wherein at least one of air and technical oxygen is supplied to the feed gas prior to being mixed with the partial stream, and wherein the $O_2$ to $SO_2$ ratio in the partial stream and feed gas mixture, based on the volumetric portions thereof, is adjusted to less than 1.2.

17. The process according to claim 16, wherein the volumetric portion of the partial stream supplied to the feed gas amounts to between 15 and 35% of the partial stream and feed gas mixture.

\* \* \* \* \*